United States Patent
Song et al.

(10) Patent No.: US 12,555,766 B2
(45) Date of Patent: Feb. 17, 2026

(54) SYSTEM FOR MANUFACTURING ELECTRODE FILM FOR SECONDARY BATTERY

(71) Applicants: Hyundai Motor Company, Seoul (KR); Kia Corporation, Seoul (KR)

(72) Inventors: Hannah Song, Ansan-si (KR); Hyunjin Kim, Daegu (KR); Hyeonha Lee, Anyang-si (KR); Kyeong Wi Park, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 809 days.

(21) Appl. No.: 17/899,242

(22) Filed: Aug. 30, 2022

(65) Prior Publication Data

US 2023/0187602 A1  Jun. 15, 2023

(30) Foreign Application Priority Data

Dec. 15, 2021 (KR) .................. 10-2021-0179427

(51) Int. Cl.
*H01M 4/04* (2006.01)
*H01M 4/139* (2010.01)

(52) U.S. Cl.
CPC ....... *H01M 4/0435* (2013.01); *H01M 4/0471* (2013.01)

(58) Field of Classification Search
None
See application file for complete search history.

(56) References Cited

U.S. PATENT DOCUMENTS

| | | |
|---|---|---|
| 2016/0043382 A1 | 2/2016 | Tanihara et al. |
| 2020/0144591 A1 | 5/2020 | Wang et al. |
| 2021/0336241 A1* | 10/2021 | Song ............... B32B 37/20 |
| 2021/0351393 A1* | 11/2021 | Kojima ............ B05C 11/028 |
| 2023/0108113 A1* | 4/2023 | Zhong ............ H01M 4/0404 |
| | | 429/304 |

FOREIGN PATENT DOCUMENTS

| | | |
|---|---|---|
| KR | 10-2000-0075083 A | 12/2000 |
| KR | 20-0449098 Y1 | 6/2010 |
| KR | 10-2011-0046671 A | 5/2011 |
| KR | 10-2015-0131390 A | 11/2015 |
| KR | 10-2016-0014986 A | 2/2016 |
| KR | 10-2021-0133365 A | 11/2021 |

* cited by examiner

*Primary Examiner* — Tracy M Dove
(74) *Attorney, Agent, or Firm* — MORGAN, LEWIS & BOCKIUS LLP

(57) ABSTRACT

A system for manufacturing an electrode film for a secondary battery by bonding a base material film and a pre-formed film may include a powder container configured to store mixture powder used for forming the pre-formed film, a powder supplier connected to the powder container to be supplied with the mixture powder from the powder container and configured to supply the mixture powder to a hopper while sliding in a preset direction, and a pair of pressurizing rollers disposed below the hopper and configured to form the pre-formed film by pressurizing the mixture powder discharged from the hopper between the pair of pressurizing rollers.

15 Claims, 5 Drawing Sheets

SYSTEM FOR MANUFACTURING ELECTRODE FILM FOR SECONDARY BATTERY

CROSS-REFERENCE TO RELATED APPLICATION

The present application claims priority to Korean Patent Application No. 10-2021-0179427 filed on Dec. 15, 2021, the entire contents of which is incorporated herein for all purposes by this reference.

BACKGROUND OF THE PRESENT DISCLOSURE

Field of the Present Disclosure

The present disclosure relates to a system for manufacturing an electrode film for a secondary battery.

Description of Related Art

The currently mass-produced secondary battery is generally fabricated by a wet process of preparing the slurry by mixing solvent and powder for electrode material, then applying the slurry to the base material, and drying it.

The wet process may secure excellent dispersion character of electrode material composed of conductive material and binder, and is an easy technology for manufacturing electrodes with uniform thickness.

Meanwhile, as the demand for battery energy density improvement and cost reduction increases, a technology for thickening the electrode is required.

However, in the wet process, when drying using hot air, the binder may float to the electrode surface due to convection.

For the present reason, there may be a drawback that the stability of the electrode is lowered as the adherence between the base material and the electrode material is weakened.

To solve the present problem, a dry process which may manufacture electrodes without using a solvent is being developed.

In the dry process, the method of squeezing the powder after applying it to the base material, and the method of bonding the powder with the base material after separately filming it are used.

When the powder is filmed separately, securing adherence between the powder film and the base material is an important factor, and R&D is required for this.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a system for manufacturing an electrode film for a secondary battery applicable to dry processing.

An exemplary system is for manufacturing an electrode film for a secondary battery by bonding a base material film and a pre-formed film each other, and the system may include a powder container configured to store mixture powder used for forming the pre-formed film, a powder supplier connected to the powder container to be supplied with the mixture powder from the powder container and configured to supply the mixture powder to a hopper while sliding in a preset direction, and a pair of pressurizing rollers disposed below the hopper and configured to form the pre-formed film by pressurizing the mixture powder discharged from the hopper between the pair of pressurizing rollers.

The powder container may be configured to store active material powder, binder powder, and conductive material powder of preset amounts. The powder container may be configured to form the mixture powder by mixing the active material powder, the binder powder, and the conductive material powder by an impeller provided in the powder container.

The powder container may be formed in a taper shape that narrows downward, and a lower end portion of the powder container may be connected to the powder supplier through a connection pipe.

A knocker configured to detach the mixture powder attached to an internal surface of the powder container by vibrating the powder container may be mounted on the powder container at an exterior of the lower end portion of powder container.

The powder supplier may be configured to be supplied with the mixture powder of a preset amount from the powder container by use of pneumatic pressure.

The hopper may be formed in a width direction of the pre-formed film, formed in a taper shape that narrows downward, and includes a discharge slot at a lower end portion of the hopper.

The hopper may be provided with at least one level sensor configured to measure a storage amount of the mixture powder within the hopper.

The powder supplier may be configured to adjust an amount of the mixture powder supplied into the hopper while sliding above the hopper in response to a detection signal of the level sensor.

The exemplary system may further include a gap roller disposed between the discharge slot of the hopper and the pair of pressurizing rollers, and configured to set a thickness of the pre-formed film by pressurizing the mixture powder discharged from the discharge slot.

The gap roller may be configured to rotate in an direction opposite to a rotation direction of a pressurizing roller adjacent to the hopper, among the pair of pressurizing rollers, and configured to set the thickness of the pre-formed film by adjusting a gap between the gap roller and the pressurizing roller adjacent to the hopper.

The gap roller may be formed in the width direction of the pre-formed film.

The pair of pressurizing rollers may be configured to receive the mixture powder primarily pressurized by the gap roller and form the pre-formed film by secondarily pressurizing the primarily pressurized mixture powder by a remaining pressurizing roller among the pair of pressurizing rollers.

The exemplary system may further include a pre-formed film bobbin configured to wind the pre-formed film formed by the pair of pressurizing rollers.

The exemplary system may further include a pair of heating rollers configured to heat and bond the base material film and the pre-formed film disposed at first and second sides of the base material film.

An exemplary method for manufacturing an electrode film for a secondary battery may include fabricating a pair of pre-formed films, and bonding a base material film between the pair of pre-formed films.

The pre-formed films may be formed from mixture powder including active material powder, binder powder, and conductive material powder.

The fabricating of the pair of pre-formed films may include supplying the mixture powder from a powder supplier to a hopper, supplying the mixture powder from the hopper to a gap formed between a primary pressurizing roller and a gap roller, and pressurizing the mixture powder having passed through the gap by the primary pressurizing roller and an opposite secondary pressurizing roller.

A level of the mixture powder in the hopper may be controlled to be uniform along a width direction of the pre-formed film by use of a plurality of level sensors.

The exemplary method may further include adjusting a thickness of the pre-formed film by adjusting the gap between the gap roller and the primary pressurizing roller.

A system for manufacturing an electrode film for a secondary battery according to various exemplary embodiments of the present disclosure may be applied to a dry processing, since the mixture powder is filmized by pressurizing.

Furthermore, according to a system for manufacturing an electrode film for a secondary battery according to an exemplary embodiment of the present disclosure, the mixture powder may be uniformly supplied within the hopper, and the amount of the mixture powder supplied to the gap roller may become uniformly spread. Therefore, freestanding pre-formed film with uniform thickness may be fabricated by repetitively pressurizing with uniform pressurizing force.

Other effects which may be obtained or are predicted by an exemplary embodiment will be explicitly or implicitly described in a detailed description of the present disclosure. That is, various effects that are predicted according to an exemplary embodiment will be described in the following detailed description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
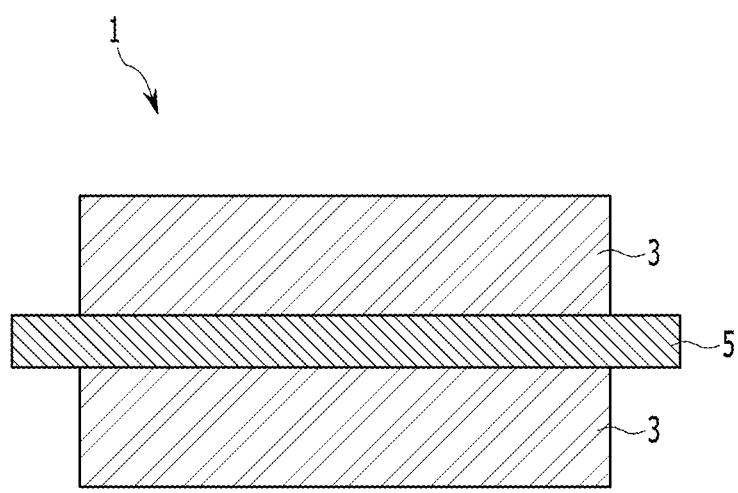
FIG. 1 is a schematic diagram of an electrode manufactured by use of a system for manufacturing an electrode film for a secondary battery according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

To clarify the present disclosure, parts that are not related to the description will be omitted, and the same elements or equivalents are referred to with the same reference numerals throughout the specification.

Also, the size and thickness of each element are arbitrarily shown in the drawings, but the present disclosure is not necessarily limited thereto, and in the drawings, the thickness of layers, films, panels, regions, etc., are exaggerated for clarity.

In addition, unless explicitly described to the contrary, the word "comprise" and variations such as "comprises" or "comprising", will be understood to imply the inclusion of stated elements but not the exclusion of any other elements.

Furthermore, in the present specification, "upper end portion", "upper portion", "upper end", or "upper portion surface" of a component indicates end portion, portion, end, or surface of the component which is relatively positioned higher in the drawing, and "lower end portion", "lower portion", "lower end", or "lower portion surface" of a component indicates end portion, portion, end, or surface of the component which is relatively positioned lower in the drawing.

FIG. 1 is a schematic diagram of an electrode manufactured by use of a system for manufacturing an electrode film for a secondary battery according to an exemplary embodiment of the present disclosure.

Referring to FIG. 1, an electrode film 1 for a secondary battery fabricated by the system 100 for fabricating an electrode film for a secondary battery according to various exemplary embodiments of the present disclosure may be either a negative electrode or a positive electrode, which are disposed opposite to each other interposing a separator.

In the present disclosure, the term "electrode film" is intended to mean either of a negative electrode or a positive electrode.

The electrode film 1 is formed by boding a base material film 5 between a pair of pre-formed films 3.

It is important to secure uniform thickness of the electrode film 1.

The system 100 for manufacturing the electrode film 1 is as follows.

Figure 2:
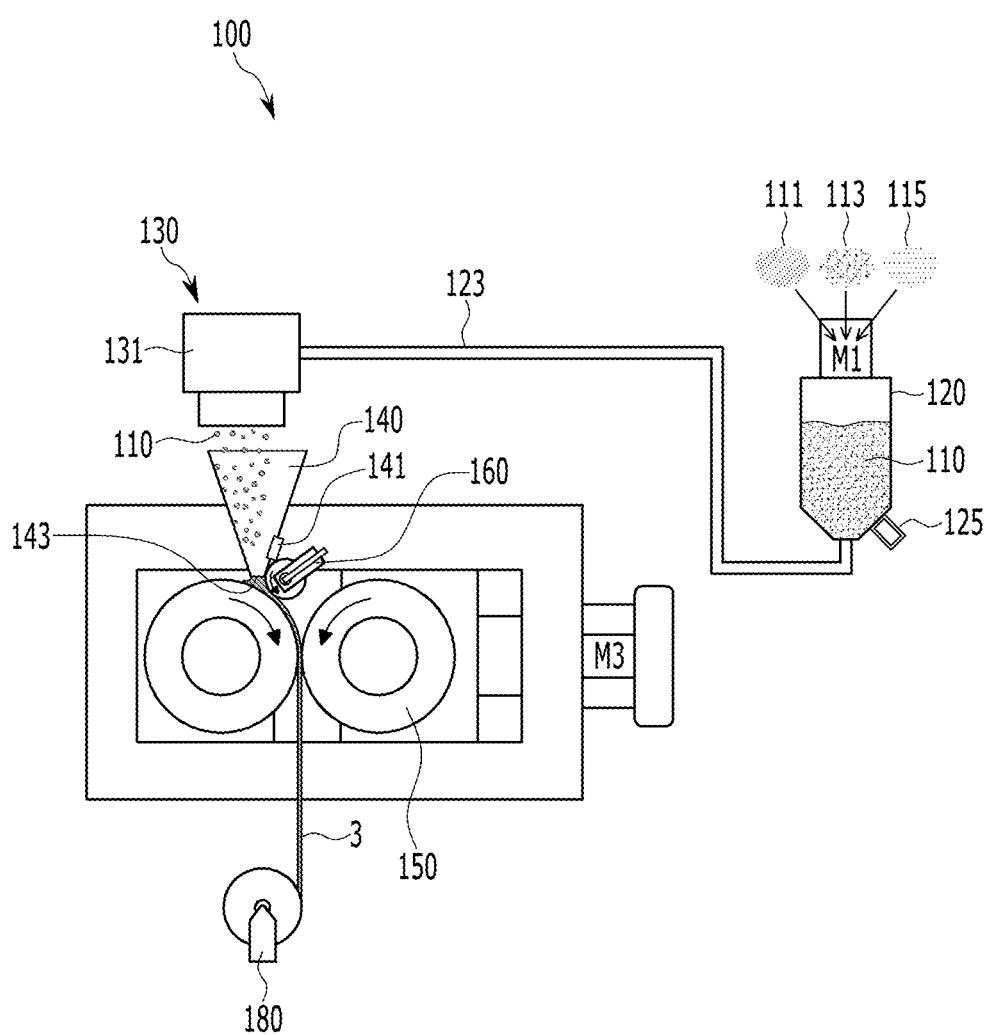
FIG. 2 is a front schematic diagram showing a system for fabricating an electrode film for a secondary battery according to an exemplary embodiment of the present disclosure.
Figure 3:
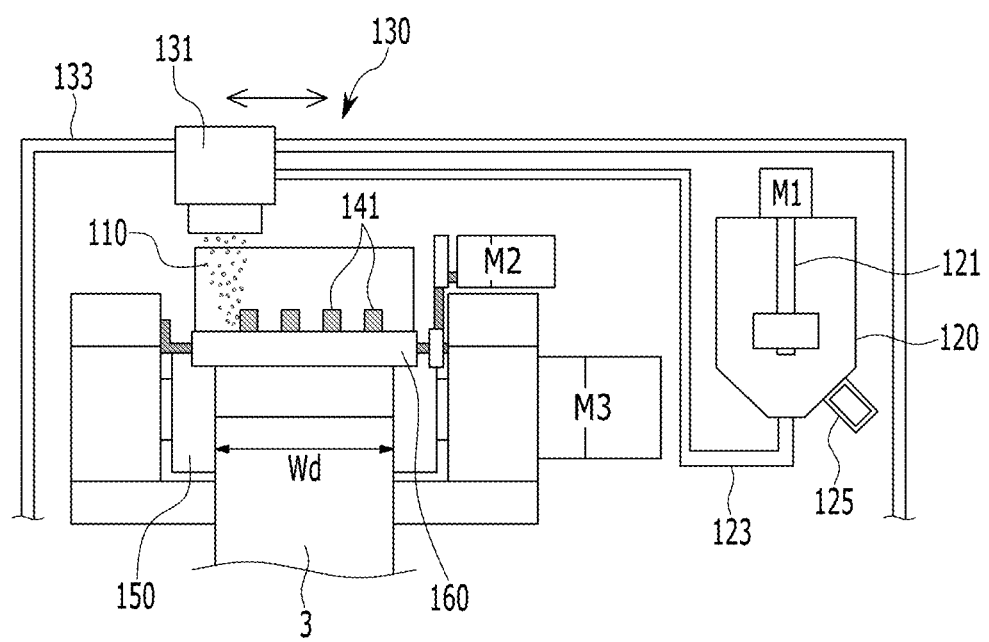
FIG. 3 is a lateral schematic diagram of a system for manufacturing an electrode film for a secondary battery according to an exemplary embodiment of the present disclosure.
Figure 4:
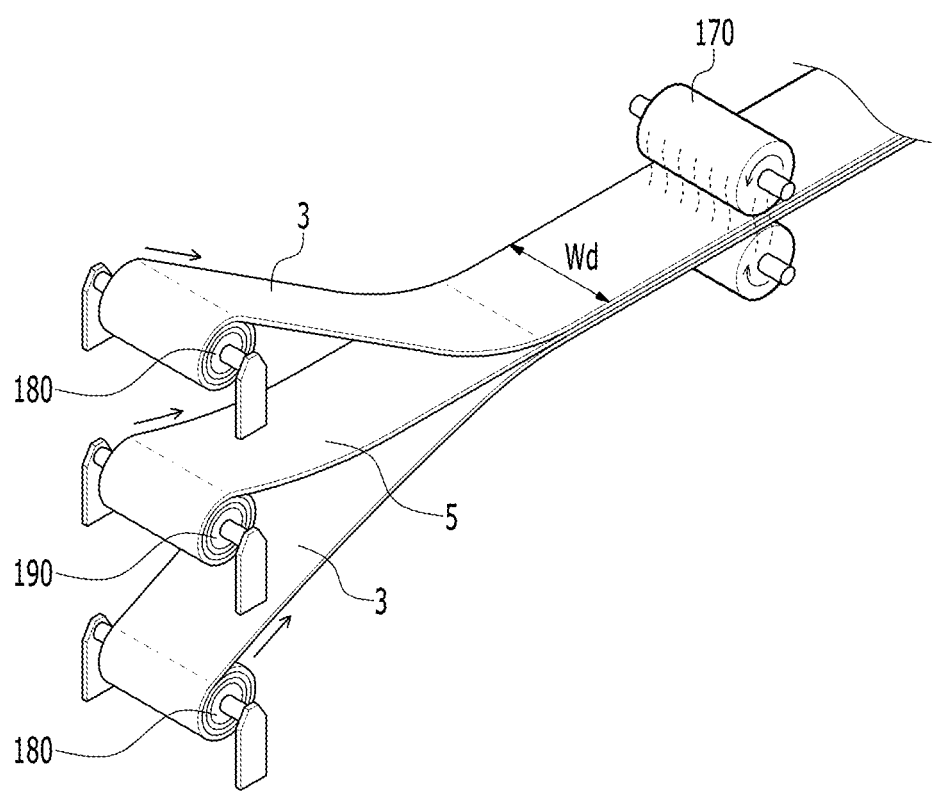
FIG. 4 illustrates an operation of a heating roller applied to a system for manufacturing an electrode film for a secondary battery according to an exemplary embodiment of the present disclosure.

FIG. 2 is a schematic diagram of a system for manufacturing an electrode film for a secondary battery according to an exemplary embodiment of the present disclosure. FIG. 3 is a lateral schematic diagram of a system for manufacturing an electrode film for a secondary battery according to an exemplary embodiment of the present disclosure. FIG. 4 illustrates an operation of a heating roller applied to a system for manufacturing an electrode film for a secondary battery according to an exemplary embodiment of the present disclosure.

Referring to FIG. 2 and FIG. 3, the system 100 for manufacturing an electrode film for a secondary battery according to an exemplary embodiment of the present disclosure includes a powder container 120, a powder supplier 130, a pair of pressurizing rollers 150, a gap roller 160, and a pair of heating rollers 170.

The powder container 120 stores mixture powder 110 to form the pre-formed film 3.

The mixture powder 110 includes active material powder 111, binder powder 113, and conductive material powder 115.

The powder container 120 is supplied with and stores the active material powder 111, the binder powder 113, and the conductive material powder 115 of preset amounts.

The active material powder 111, the binder powder 113, and the conductive material powder 115 of the preset amounts may form the mixture powder 110 by being mixed by an impeller 121 provided in the powder container 120.

The impeller 121 may be operated by a motor M1.

Furthermore, the powder container 120 may have a taper shape that narrows downward.

A lower end portion of the powder container 120 may be connected to the powder supplier 130 through a connection pipe 123.

That is, the mixture powder 110 is collected in the lower portion of the powder container 120 by the taper shape of the powder container 120.

The lower portion of the powder container 120 is connected to the connection pipe 123, and thus the mixture powder 110 may move to the powder supplier 130 through the connection pipe 123.

Furthermore, a knocker 125 may be mounted on the powder container 120 at an exterior of the lower end portion of the powder container 120 forming a slanted surface.

The knocker 125 may detach the mixture powder 110 attached to an internal surface thereof by vibrating the powder container 120.

The knocker 125 may periodically vibrate the powder container 120.

The powder container 120 may be configured to be detachable from the powder supplier 130 depending on a specification of the mixture powder 110.

That is, the powder container 120 may be replaced correspondingly depending on the specification of the mixture powder 110.

Furthermore, the powder supplier 130 is connected to the powder container 120 to be supplied with the mixture powder 110.

The powder supplier 130 may supply the mixture powder 110 to a hopper 140 while sliding by an actuator in a preset direction thereof.

The powder supplier 130 may include a storage portion 131 configured to store the mixture powder 110 and a frame 133 configured to guide sliding of the storage portion 131 by the actuator in the preset direction.

That is, the storage portion 131 of the powder supplier 130 may discharge the stored mixture powder 110 while sliding along the frame 133.

The powder supplier 130 may be configured to be supplied with the mixture powder 110 of preset amount from the powder container 120 by use of pneumatic pressure.

Furthermore, the hopper 140 may be formed in a width direction Wd of the pre-formed film 3.

The hopper 140 may be formed in a taper shape that narrows downward, and may be configured to form a discharge slot 143 at a lower end portion.

That is, the discharge slot 143 may be formed in the width direction Wd of the pre-formed film 3.

The hopper 140 is provided with at least one level sensor 141 at a side surface of the hopper 140.

In an exemplary embodiment of the present disclosure, as shown in FIG. 3, a plurality of level sensors 141 may be employed.

The level sensors 141 are configured to measure a storage amount of the mixture powder 110 within the hopper 140.

The level sensors 141 may be disposed in a straight line in a longitudinal direction of the hopper 140.

It may be understood that the level sensor 141 is employed to evenly supply the mixture powder 110 within the hopper 140.

Thus, the powder supplier 130 may adjust an amount of the mixture powder 110 supplied into the hopper 140 while sliding above the hopper 140 according to a detection signal of the level sensor 141.

The pair of pressurizing rollers 150 are disposed below the hopper 140.

The gap roller 160 is disposed between the discharge slot 143 of the hopper 140 and the pair of pressurizing rollers 150.

The gap roller 160 may set a thickness of the pre-formed film 3 by pressurizing the mixture powder 110 discharged from the discharge slot 143.

In detail, the gap roller 160 is configured to rotate in an opposite direction to a pressurizing roller 150 adjacent to the hopper 140, among the pair of pressurizing rollers 150.

Thus, the gap roller 160 may set the thickness of the pre-formed film 3 by adjusting a gap to the pressurizing roller 150 adjacent to the hopper 140.

The gap roller 160 may be formed in the width direction Wd of the pre-formed film 3.

The gap roller 160 may be operated by a motor M2.

Furthermore, the pair of pressurizing rollers 150 may form the pre-formed film 3 by pressurizing the mixture powder 110 discharged from the hopper 140.

The pair of pressurizing rollers 150 receives the mixture powder 110 primarily pressurized by the gap roller 160 and forms the pre-formed film 3 by secondarily pressurizing the primarily pressurized mixture powder 110.

The pre-formed film 3 formed by the pair of pressurizing rollers 150 is wound on a pre-formed film bobbin 180.

The pre-formed film 3 formed by the pair of pressurizing rollers 150 is supplied to a heating roller 170 for bonding with the base material film 5 (refer to FIG. 4).

The pair of pressurizing rollers 150 may be operated by motor M3.

Figure 5:
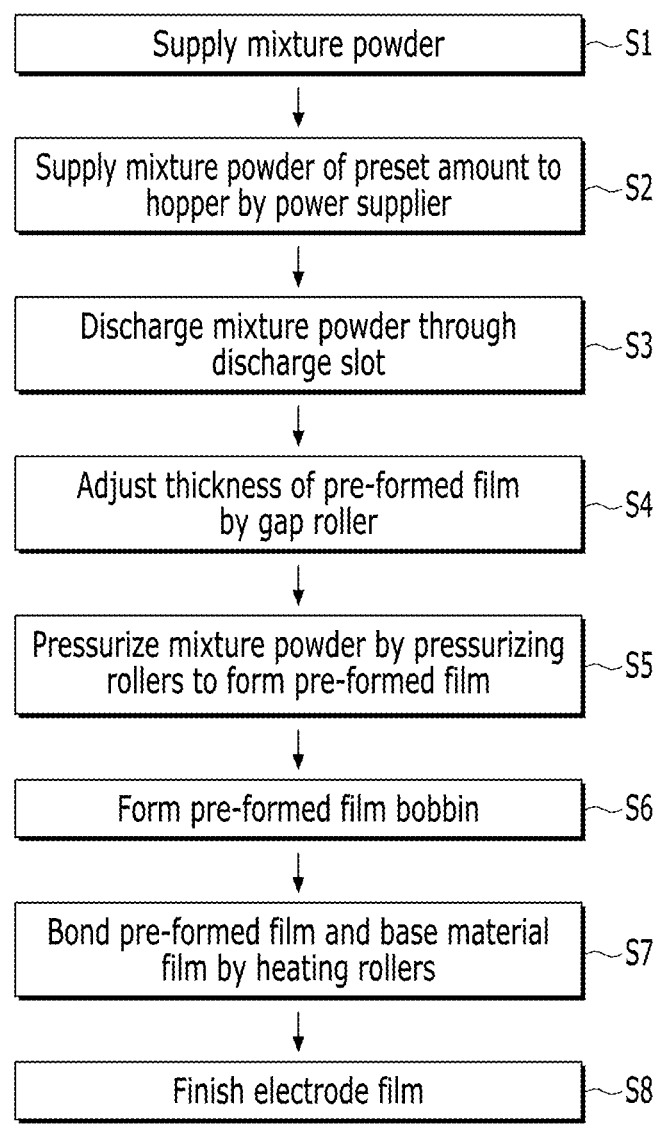
FIG. 5 is an operation flowchart of a system for manufacturing an electrode film for a secondary battery according to an exemplary embodiment of the present disclosure.

FIG. 5 is an operation flowchart of a system for manufacturing an electrode film for a secondary battery according to an exemplary embodiment of the present disclosure.

The electrode film 1 for a secondary battery may be fabricated as shown in FIG. 5 by use of the system 100 for manufacturing an electrode film for a secondary battery according to an exemplary embodiment of the present disclosure.

At step S1, depending on the specification of the pre-formed film 3, the mixture powder 110 is supplied to the powder container 120.

At the step S1, the amounts of the active material powder 111, the binder powder 113, and the conductive material powder 115 forming the mixture powder 110 may be adjusted depending on the specification of the pre-formed film 3.

The mixture powder 110 stored in the powder container 120 is supplied to the powder supplier 130 by pneumatic pressure.

Subsequently at step S2, while the powder supplier 130 slides above the hopper 140, the mixture powder 110 is supplied from the powder supplier 130 to the hopper 140.

At the present time, the storage amount of the mixture powder 110 supplied within the hopper 140 is measured by the level sensor 141 mounted on the hopper 140.

Based on a detection signal of the level sensor 141, the powder supplier 130 supplies the mixture powder 110 to the hopper 140 while the storage portion 131 moves in the width direction Wd along the frame 133 so that the storage amount of the mixture powder 110 within the hopper 140 may be evenly spread over an entire region of the hopper 140.

At step S3, the mixture powder 110 within the hopper 140 is discharged through the discharge slot 143 of the hopper 140 by its own weight.

At step S4, the mixture powder 110 discharged from the discharge slot 143 is primarily pressurized by the gap roller 160 disposed adjacent to the discharge slot 143, and accordingly, the thickness of the pre-formed film 3 is accordingly set.

At step S5, the mixture powder 110 primarily pressurized by the gap roller 160 is supplied between the pair of pressurizing rollers 150.

The primarily pressurized mixture powder 110 is secondarily pressurized by the pair of pressurizing rollers 150, and thereby the pre-formed film 3 is formed.

At step S6, the pre-formed film 3 formed by passing through the pair of pressurizing rollers 150 is wound on the pre-formed film bobbin 180.

The pre-formed film bobbin 180 wound with the pre-formed film 3 is disposed at both sides of a base material film bobbin 190 wound with the base material film 5 so that the base material film 5 may be interposed between the pre-formed films 3.

That is, at step S7, the pre-formed film 3, the base material film 5, and the pre-formed film 3 are sequentially stacked, and are supplied to between the pair of heating rollers 170.

At step S8, the stack of the pre-formed film 3, the base material film 5, and the pre-formed film 3 are bonded by the pair of heating rollers 170 through pressurizing and heating, and accordingly, the electrode film 1 is finished.

The system 100 for manufacturing an electrode film for a secondary battery according to various exemplary embodiments of the present disclosure may be applied to a dry processing, since the mixture powder 110 is filmized by pressurizing.

Furthermore, according to the system 100 for manufacturing an electrode film for a secondary battery according to an exemplary embodiment of the present disclosure, the mixture powder 110 may be uniformly supplied within the hopper 140, and the amount of the mixture powder 110 supplied to the gap roller 160 may become uniformly spread.

Furthermore, freestanding pre-formed film with uniform thickness may be fabricated by repetitively pressurizing with uniform pressurizing force.

As a result, the electrode film for a secondary battery may provide uniform performance over an entire range of the electrode film.

In an exemplary embodiment of the present invention, a controller is connected to at least one of the elements of the system 100 such as the motors M1, M2 and M3, level sensors 141, and the actuator of powder supplier 130 but not limited thereto, to control the operations thereof In addition, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system and store and execute program instructions which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code that may be executed by a computer using an interpreter or the like.

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for manufacturing an electrode film for a secondary battery by bonding a base material film and a pre-formed film with each other, the system comprising:
   a powder container configured to store mixture powder used for forming the pre-formed film;
   a powder supplier connected to the powder container to be supplied with the mixture powder from the powder container and configured to supply the mixture powder to a hopper while the powder supplier slides in a preset direction; and
   a pair of pressurizing rollers disposed below the hopper and configured to form the pre-formed film by pressurizing the mixture powder discharged from the hopper between the pair of pressurizing rollers.

2. The system of claim 1,
   wherein the powder container is configured to store active material powder, binder powder, and conductive material powder of preset amounts; and
   wherein the powder container is configured to form the mixture powder by mixing the active material powder, the binder powder, and the conductive material powder by an impeller provided in the powder container.

3. The system of claim 1,
   wherein the powder container is formed in a taper shape that narrows downward; and
   wherein a lower end portion of the powder container is connected to the powder supplier through a connection pipe.

4. The system of claim 3, wherein a knocker configured to detach the mixture powder attached to an internal surface of the powder container by vibrating the powder container is mounted on the powder container at an exterior of the lower end portion of powder container.

5. The system of claim 1, wherein the powder supplier is configured to be supplied with the mixture powder of a preset amount from the powder container by use of pneumatic pressure.

6. The system of claim 1, wherein the hopper is disposed in a width direction of the pre-formed film, formed in a taper shape that narrows downward, and includes a discharge slot at a lower end portion of the hopper.

7. The system of claim 6, wherein the hopper is provided with at least one level sensor configured to measure a storage amount of the mixture powder within the hopper.

8. The system of claim 7, wherein the powder supplier is configured to adjust an amount of the mixture powder supplied into the hopper while sliding above the hopper in response to a detection signal of the level sensor.

9. The system of claim 6, further including a gap roller disposed between the discharge slot of the hopper and the pair of pressurizing rollers, and configured to set a thickness of the pre-formed film by pressurizing the mixture powder discharged from the discharge slot.

10. The system of claim 9, wherein the gap roller is configured to rotate in an direction opposite to a rotation direction of a pressurizing roller adjacent to the hopper, among the pair of pressurizing rollers, and configured to set the thickness of the pre-formed film by adjusting a gap between the gap roller and the pressurizing roller adjacent to the hopper.

11. The system of claim 9, wherein a longitudinal axis of the gap roller is formed in a width direction of the pre-formed film.

12. The system of claim 9, wherein the pair of pressurizing rollers is configured to receive the mixture powder primarily pressurized by the gap roller and form the pre-formed film by secondarily pressurizing the primarily pressurized mixture powder by the pressurizing roller adjacent to the hopper and a remaining pressurizing roller among the pair of pressurizing rollers.

13. The system of claim 12, further including a pre-formed film bobbin configured to wind the pre-formed film formed by the pair of pressurizing rollers.

14. The system of claim 1, further including a pair of heating rollers configured to heat and bond the base material film and the pre-formed film disposed at first and second sides of the base material film.

15. The system of claim 1, further including a plurality of level sensors disposed in a straight line in a longitudinal direction of the hopper, wherein a level of the mixture powder in the hopper is controlled to be uniform by use of the plurality of level sensors.

* * * * *